United States Patent
Kim

(10) Patent No.: US 8,945,735 B2
(45) Date of Patent: Feb. 3, 2015

(54) BUILT-IN CHARGE CIRCUIT FOR SECONDARY BATTERY AND SECONDARY BATTERY WITH THE BUILT-IN CHARGE CIRCUIT

(75) Inventor: Youngjun Kim, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 839 days.

(21) Appl. No.: 12/708,151

(22) Filed: Feb. 18, 2010

(65) Prior Publication Data

US 2010/0215994 A1 Aug. 26, 2010

Related U.S. Application Data

(60) Provisional application No. 61/154,683, filed on Feb. 23, 2009.

(51) Int. Cl.
- *H01M 14/00* (2006.01)
- *H01M 10/46* (2006.01)
- *H02J 7/00* (2006.01)

(52) U.S. Cl.
CPC ............ *H01M 10/46* (2013.01); *H02J 7/0034* (2013.01); *H02J 7/0011* (2013.01)
USPC .......................................................... 429/7

(58) Field of Classification Search
CPC .......... H01M 10/46; H02H 11/00; H02J 7/00; H02J 7/0034; H02J 7/0011; Y02E 60/12
USPC ........................................................... 429/7
See application file for complete search history.

(56) References Cited

U.S. PATENT DOCUMENTS

| 5,945,812 A | 8/1999 | Choi |
| 2002/0141124 A1* | 10/2002 | Ito et al. ............ 361/84 |
| 2005/0127871 A1 | 6/2005 | Orikasa |

(Continued)

FOREIGN PATENT DOCUMENTS

| EP | 1 868 274 A1 | 12/2007 |
| JP | 06005310 A2 | 1/1994 |

(Continued)

OTHER PUBLICATIONS

Notice of Allowance dated Oct. 13, 2011 for corresponding KR Application No. 10-2010-0016083.

(Continued)

*Primary Examiner* — Gary Harris
(74) *Attorney, Agent, or Firm* — Knobbe Martens Olson & Bear LLP

(57) ABSTRACT

A secondary battery which includes a built-in charge circuit. The secondary battery includes a bare cell having a positive electrode and a negative electrode; a protection circuit section electrically connected to the bare cell; a positive electrode charge/discharge terminal and a negative electrode charge/discharge terminal electrically connected to the protection circuit section; a charge circuit section for supplying a charging current to the protection circuit section; and a positive electrode charge terminal and a negative electrode charge terminal electrically connected to the charge circuit section, wherein the charge circuit section includes a first reverse-current prevention part, and a second reverse-current prevention part for preventing damage of the first reverse-current prevention part due to the reversed charge.

13 Claims, 2 Drawing Sheets

(56) References Cited

U.S. PATENT DOCUMENTS

| | | | |
|---|---|---|---|
| 2005/0162131 A1* | 7/2005 | Sennami et al. | 320/128 |
| 2006/0164042 A1 | 7/2006 | Sime | |
| 2009/0295332 A1 | 12/2009 | Yang et al. | |
| 2009/0295335 A1 | 12/2009 | Yang et al. | |

FOREIGN PATENT DOCUMENTS

| | | |
|---|---|---|
| JP | 2000253586 A2 | 9/2000 |
| JP | 2003-219573 | 7/2003 |
| JP | 2004222427 | 8/2004 |
| JP | 2007252086 A2 | 9/2007 |
| JP | 2007329000 A2 | 12/2007 |
| JP | 2008005644 | 1/2008 |
| KR | 10 02419060000 | 11/1999 |
| KR | 1020030072027 | 9/2003 |
| KR | 10-330442 | 10/2003 |
| KR | 20-0330442 | 10/2003 |
| KR | 1020050057693 | 6/2005 |
| KR | 1020060086024 | 7/2006 |
| KR | 100653325 B1 | 11/2006 |
| KR | 2008-34321 | 4/2008 |
| KR | 1020080034321 | 4/2008 |

OTHER PUBLICATIONS

European Search Report for corresponding EP Application No. 10154380.9-2207, dated Oct. 19, 2010.

* cited by examiner (PRIOR ART)

US 8,945,735 B2

BUILT-IN CHARGE CIRCUIT FOR SECONDARY BATTERY AND SECONDARY BATTERY WITH THE BUILT-IN CHARGE CIRCUIT

RELATED APPLICATIONS

This application claims the benefit of U.S. Provisional Application No. 61/154,683, filed Feb. 23, 2009, entitled BUILT-IN CHARGE CIRCUIT FOR SECONDARY BATTERY AND SECONDARY BATTERY WITH THE BUILT-IN CHARGE CIRCUIT, which is hereby incorporated by reference in its entirety.

BACKGROUND OF THE INVENTION

1. Field of the Invention

The present invention relates to a secondary battery. More specifically, the present invention relates to a built-in charge circuit for a secondary battery and a secondary battery with the built-in charge circuit.

2. Description of the Related Art

With the rapid advance and development in recent years of electronic, information communication and computer industries, there is increasing use of portable electronic devices. Secondary (rechargeable) batteries are largely used as power sources for portable electronic devices.

Pack-type batteries are currently widely used as secondary batteries. A pack-type secondary battery generally has a structure in which a bare cell storing and supplying electrical energy and a protection circuit controlling charge/discharge of the bare cell are integrated into one unit.

The secondary battery utilized in a portable electronic device such as a portable computer is constructed such that the battery is charged in a state where it was mounted on the portable electronic device. Charge circuit built-in secondary batteries have also recently been used which are configured such that the battery can be charged even in a state where it is separated from the portable electronic device. Unfortunately, conventional charge circuits built in the secondary batteries are potentially susceptible to damage due to an electric current arising from the reversed charge connection of circuit components.

FIG. 1 shows a block diagram of a secondary battery having a conventional charge circuit built therein. Referring to FIG. 1, a secondary battery 10 includes a bare cell 20, a protection circuit section 30, and a charge circuit section 40. The charge circuit section 40 is formed in such a manner that the secondary battery 10 can be charged in a state where it is detached from a portable electronic device (not shown). The charge circuit section 40 includes a first switching element 42 connected to a positive electrode charge terminal 41 and a reverse-current prevention element 44 connected to a negative electrode charge terminal 43, such that the charge circuit section 40 is operated in a step-down fashion where an input voltage is higher than an output voltage. A duty ratio of the first switching element 42 is controlled by a pulse width modulation (PWM) controller 45, so a desired charge voltage is obtained. A given charge voltage obtained by means of the first switching element 42 is stored in a choke coil 46 and is applied to the protection circuit section 30. The reverse-current prevention element 44 prevents a flow of the charging current to the negative electrode charge terminal 43. When the first switching element 42 is turned off, a field effect transistor (FET) 48 of the reverse-current prevention element 44 is turned on, so the energy stored in the choke coil 46 exits through a forward path of a diode 47 of the reverse-current prevention element 44.

The secondary battery 10 can be charged even in a state where it is mounted on the portable electronic device. This is carried out through a positive electrode charge/discharge terminal 31 and a negative electrode charge/discharge terminal 32, which are connected to the protection circuit section 30. However, when the positive electrode charge/discharge terminal 31 and the negative electrode charge/discharge terminal 32 are wrongly reverse-connected to the portable electronic device, this leads to the occurrence of reversed charge. The protection circuit section 30 detects the reversed charge event to thereby turn off a charge switching element 33 and a discharge switching element 34, resulting in protection of the protection circuit section 30. However, an undesirable current (I), as indicated by a dotted line, is generated in the charge circuit section 40. This current (I) will sequentially pass through the negative electrode charge terminal 43, the reverse-current prevention element 44, the choke coil 46, and the positive electrode charge/discharge terminal 31. A flow of the current (I) leads to heat generation of the reverse-current prevention element 44, which will consequently contribute to damage of the reverse-current prevention element 44.

BRIEF SUMMARY OF THE INVENTION

Therefore, the present invention has been made in view of the above problems, and it is an object of the present invention to provide a built-in charge circuit for a secondary battery, which is capable of preventing damage of battery components due to the reversed charge, and a secondary battery with the built-in charge circuit.

In accordance with the present invention, the above and other objects can be accomplished by the provision of a secondary battery including a bare cell having a positive electrode and a negative electrode; a protection circuit section electrically connected to the bare cell; a positive electrode charge/discharge terminal and a negative electrode charge/discharge terminal electrically connected to the protection circuit section; a charge circuit section for supplying a charging current to the protection circuit section; and a positive electrode charge terminal and a negative electrode charge terminal electrically connected to the charge circuit section, wherein the charge circuit section includes a first reverse-current prevention part, and a second reverse-current prevention part for preventing damage of the first reverse-current prevention part due to the reversed charge.

In one aspect, the aforementioned needs are satisfied by one implementation of the present invention which comprises a secondary battery comprises a bare cell and a protection circuit coupled to the bare cell wherein the protection circuit includes a positive electrode terminal and a negative electrode terminal that are adapted to be coupled to a load. In this implementation, the secondary battery further includes a charge circuit section having a positive electrode charge terminal and a negative electrode charge terminal wherein the charge circuit section is coupled to the bare cell. In this implementation, the charge circuit section includes a first reverse-current prevention part that inhibits the flow of charging current to the negative electrode charge terminal and a second reverse current prevention part for inhibiting damage due to the flow of reverse current due to reversed charge on the positive electrode terminals and the negative electrode terminal of the protection circuit.

In another implementation the aforementioned needs are satisfied by a secondary battery comprising a bare cell and a protection circuit interconnected between the bare cell and terminals that are adapted to be coupled to the load, wherein the protection circuit controls the state of charge of the bare cell. In this implementation, the secondary battery further comprises a charge circuit that has a positive and a negative electrode input, wherein the charge circuit provides charge to the bare cell via the protection circuit and wherein the charge circuit defines a positive charge path that extends between the positive electrode and the protection circuit. In this implementation, a first switching device and a charge storage device is positioned along the positive charge path and the charge circuit defines a stored energy discharge path between the storage device and the negative input electrode. In this implementation, a first reverse current protection element is positioned along the stored energy discharge path and the charge circuit includes a second reverse current protection element that inhibits damage to the charge circuit due to reverse charge on the terminals of the protection circuit that couple to the load.

These and other objects and advantages will become more apparent from the following description taken in conjunction with the accompanying drawings.

DETAILED DESCRIPTION OF THE PREFERRED EMBODIMENTS

Hereinafter, embodiments of the present invention will be described in more detail with reference to the accompanying drawings.

Figure 1:
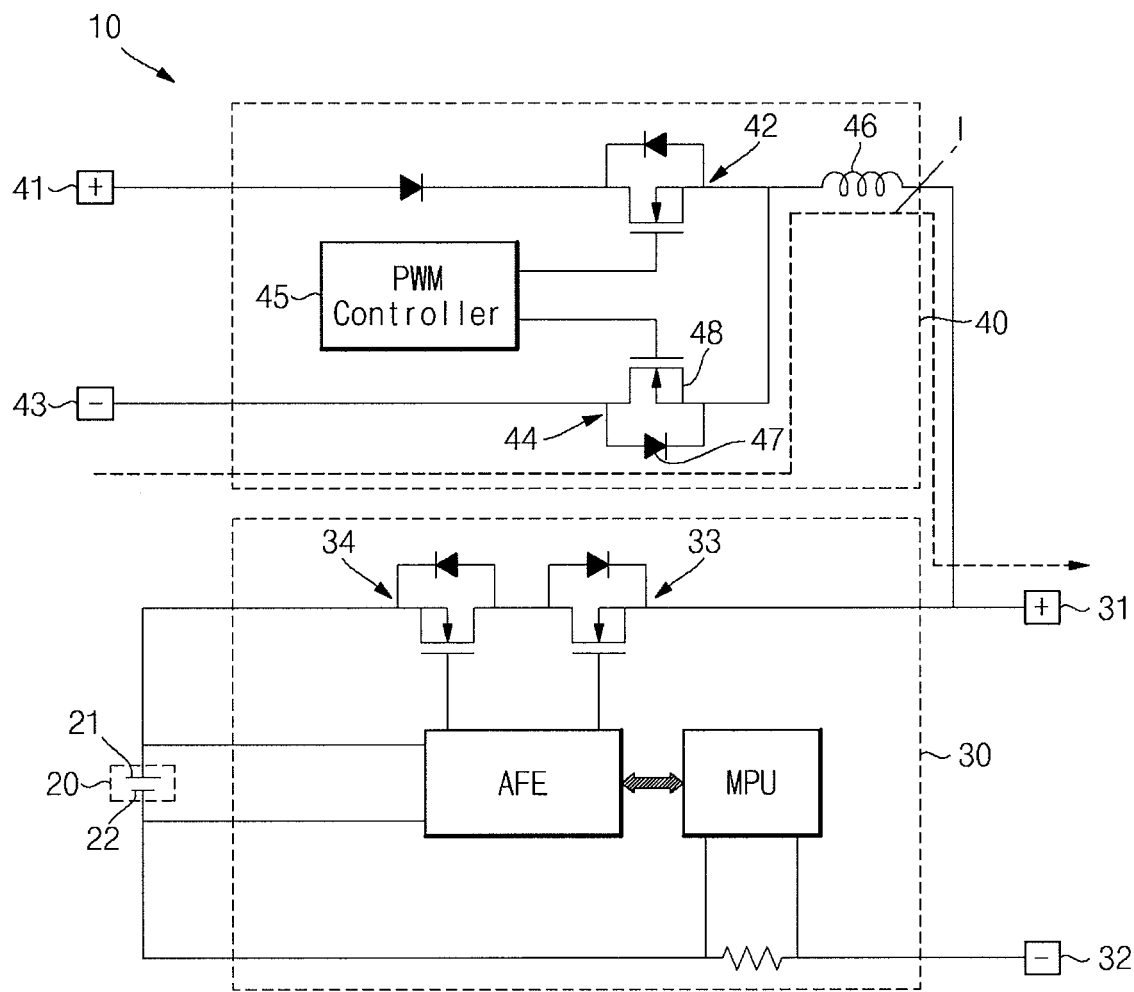
FIG. 1 is a block diagram of a conventional secondary battery with a built-in charge circuit.
Figure 2:
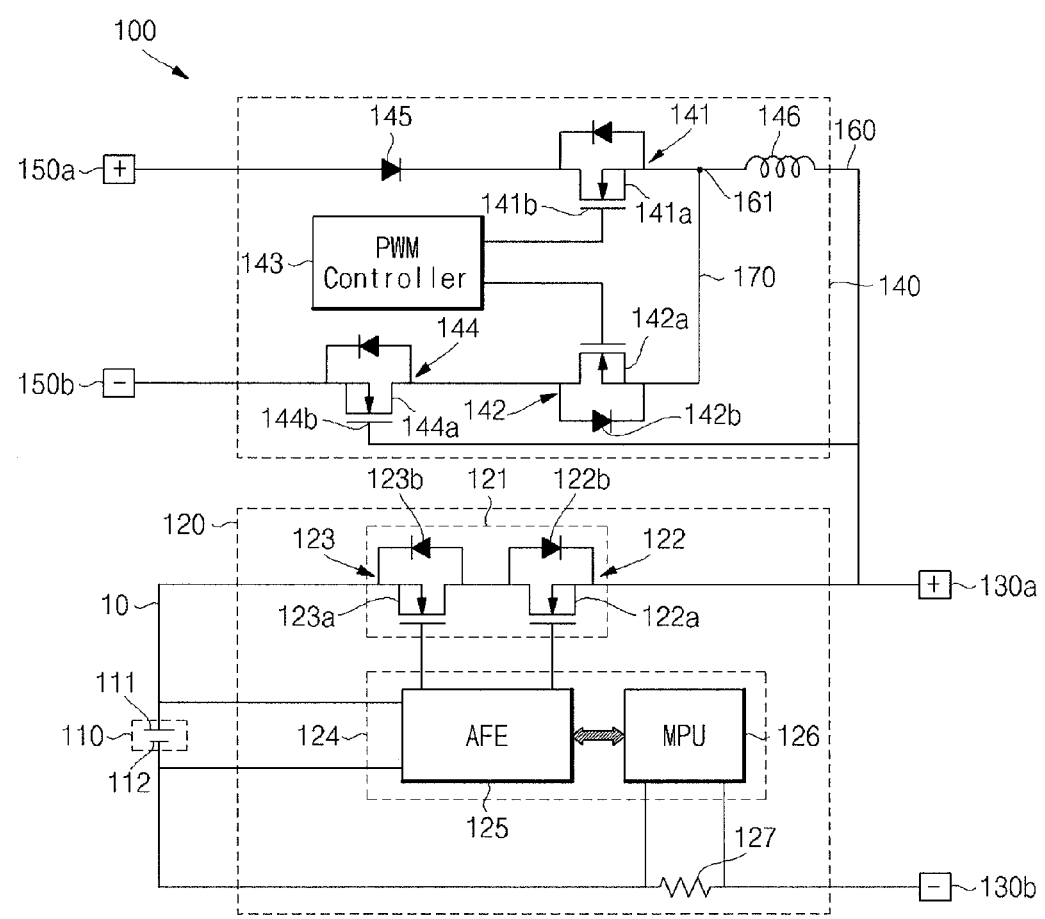
FIG. 2 is a block diagram of a secondary battery with a built-in charge circuit in accordance with one embodiment of the present invention.

FIG. 2 is a block diagram of a secondary battery in accordance with one embodiment of the present invention.

Referring to FIG. 2, a secondary battery 100 includes a bare cell 110, a protection circuit section 120, positive and negative electrode charge/discharge terminals 130a, 130b electrically connected to the protection circuit section 120, a charge circuit section 140, and positive and negative electrode charge terminals 150a, 150b electrically connected to the charge circuit section 140.

The bare cell 110 is a device which stores electrical energy and supplies it to the outside, and includes a positive electrode 111 and a negative electrode 112. The bare cell 110 may be a lithium ion cell or lithium polymer cell. Although the bare cell 110 is shown as a single cell, the present invention is not limited thereto. The bare cell 110 may have a structure where multiple cells are connected in series, parallel or any combination thereof.

The protection circuit section 120 includes a charge/discharge switching section 121, a charge/discharge control section 124, and a current detector 127. The protection circuit section 120 controls the overall operation including charge/discharge of the bare cell 110.

The charge/discharge switching section 121 includes a charge switching element 122 and a discharge switching element 123. The charge/discharge switching section 121 sets up the direction of electrical current flow in response to charge/discharge of the cell.

The charge switching element 122 includes a charge field effect transistor (FET) 122a and a parasitic diode 122b for the charge FET (hereinafter referred to as "charge FET parasitic diode 122b") and connected in parallel to the charge FET 122a. The charge FET 122a is disposed such that a drain and a source are placed on a large-current path 10 of the bare cell 110. In the context of the present invention, the large-current path 10 refers to a path through which a charging/discharging current of the bare cell 110 flows. The charge FET 122a is turned on/off in response to control signals being input from the charge/discharge control section 124 through a gate. The charge FET 122a is turned on upon charging of the battery cell and then applies the charging current to the bare cell 110.

The charge FET parasitic diode 122b is connected in a direction opposite to the direction of the charging current. When the charge FET 122a is turned off, the charge FET parasitic diode 122b cuts off the charging current and provides a discharge current path.

The discharge switching element 123 includes a discharge FET 123a and a parasitic diode 123b for the discharge FET (hereinafter referred to as "discharge FET parasitic diode 123b") and connected in parallel to the discharge FET 123a.

The discharge FET 123a is disposed such that a drain and a source are placed on the large-current path 10 of the bare cell 110. The discharge FET 123a is turned on/off in response to control signals being input from the charge/discharge control section 124 through a gate. The discharge FET 123a is turned on upon discharging of the battery cell and then applies a discharging current of the bare cell 110 to an external load (not shown) through the positive electrode charge/discharge terminal 130a and the negative electrode charge/discharge terminal 130b.

The discharge FET parasitic diode 123b is connected in a direction opposite to the direction of the discharging current. When the discharge FET 123a is turned off, the discharge FET parasitic diode 123b cuts off the discharging current and provides a charge current path.

The charge/discharge control section 124 includes an analog front end (AFE) 125 and a micro-processor unit (MPU) 126.

The AFE 125 is electrically connected to the positive electrode 111 and the negative electrode 112 of the bare cell 110, respectively. In addition, the AFE 125 is electrically connected to a gate of the charge FET 122a and a gate of the discharge FET 123a. The AFE 125 detects an open-circuit voltage (OCV) corresponding to a voltage difference between the positive electrode 111 and the negative electrode 112 of the bare cell 110, and then it determines an overdischarge mode, a full discharge mode, a full charge mode and an overcharge mode of the bare cell 110 and turns on/off the charge FET 122a and the discharge FET 123a of the charge/discharge switching section 121, depending on each mode. In this case, the AFE 125 is provided with built-in installation of a power control circuit for controlling the charge/discharge switching section 121.

The AFE 125 is an Application Specific Integrated Circuit (ASIC) and is an electric power-driven circuit element for immediately detecting an open-circuit voltage (OCV) of the battery 110 and driving the charge/discharge switching section 121. Therefore, the AFE 125 turns on/off the charge FET 122a and the discharge FET 123a of the charge/discharge switching section 121 at a very high response speed, depending on each mode of the bare cell, thus providing primary protection of the bare cell 110.

The MPU 126 includes a microprocessor (not shown) and passive elements (not shown), active elements (not shown) and memories (not shown) electrically connected to the microprocessor. The MPU 126 is electrically connected to the AFE 125 to thereby receive an input of OCV information of the bare cell 110 and detect the OCV of the bare cell 110.

Further, the MPU 126 can change setup voltages of overdischarge, full discharge, full charge and overcharge modes established in the AFE 125. Further, the MPU 126 outputs control signals to the AFE 125 to thereby control the charge/discharge switching section 121. Further, the MPU 126 calculates the charging current and discharging current of the bare cell 110. In this case, the MPU 126 is electrically connected to both ends of the current detection element 127 and measures changes in the voltage difference between both ends of the current detection element 127, thereby calculating a current value.

The current detection element 127 is disposed on the large-current path 10. Both ends of the current detection element 127 are electrically connected to the MPU 126. In this embodiment, the current detection element 127 is formed of a sense resistor. The MPU 126 measures the voltage difference between both ends of the current detection element 127, thereby calculating values of the charging current and discharging current flowing in the large-current path 10.

The positive electrode charge/discharge terminal 130a and the negative electrode charge/discharge terminal 130b are electrically connected to the protection circuit section 120. The positive electrode charge/discharge terminal 130a and the negative electrode charge/discharge terminal 130b are components where the secondary battery 100 is electrically connected to a portable electronic device (not shown), when the secondary battery 100 is mounted on the portable electronic device such as portable computer. The positive electrode charge/discharge terminal 130a is electrically connected to the positive electrode 111 of the bare cell 110, on the large-current path 10. The negative electrode charge/discharge terminal 130b is electrically connected to the negative electrode 112 of the bare cell 110, on the large-current path 10. The negative electrode charge/discharge terminal 130b is grounded. The charge/discharge of the bare cell 110 can be achieved through the positive electrode charge/discharge terminal 130a and the negative electrode charge/discharge terminal 130b.

The charge circuit section 140 is installed within the secondary battery 100, such that the secondary battery 100 can be conveniently charged even when it is separated from the portable electronic device (not shown). The charge circuit section 140 drops an input voltage, which was input through the positive electrode charge terminal 150a and the negative electrode charge terminal 150b, to a desired level in a conventional step-down manner and then applies the output voltage to the protection circuit section 120. The charge circuit section 140 includes a first switching element 141, a first reverse-current prevention element 142, a pulse width modulation (PWM) controller 143, a second reverse-current prevention element 144, a third reverse-current prevention element 145, and a choke coil 146. The charge circuit section 140 is formed on a first path 160 connecting between the positive electrode charge terminal 150a and the positive electrode charge/discharge terminal 130a, and a second path 170 connecting between the first point 161 of the first path 160 and the grounded negative electrode charge terminal 130b. The first switching element 141 and the third reverse-current prevention element 145 are sequentially positioned on the first path 160 in the direction of from the first point 161 to the positive electrode charge terminal 150a. The choke coil 146 is positioned on the first path 160 in the direction of from the first point 161 to the positive electrode charge/discharge terminal 130a. The first reverse-current prevention element 142 and the second reverse-current prevention element 144 are sequentially positioned on the second path 170 in the direction of from the first point 161 to the negative electrode charge terminal 150b.

The first switching element 141 includes a first FET 141a. The first FET 141a is disposed such that a source and a drain are placed on the first path 160 connecting between the positive electrode charge terminal 150a and the protection circuit section 120. The first FET 141a is turned on/off in response to control signals being input from the PWM controller 143 through a gate, thereby controlling a duty ratio of the first FET 141a. Accordingly, the input voltage which was input through the positive electrode charge terminal 150a and the negative electrode charge terminal 150b is then dropped to a charge voltage.

The first reverse-current prevention element 142 is disposed on the second path 170 providing an electrical connection between the first point 161 of the first path 160 and the negative electrode charge terminal 144b. The first reverse-current prevention element 142 includes a second FET 142a and a parasitic diode 142b for the second FET (hereinafter referred to as "second FET parasitic diode 142b") connected in parallel to the second FET 142a. The second FET 142a is disposed such that a source and a drain are placed on the second path 170. The second FET 142a is turned on/off in response to control signals being input from the PWM controller 143. The operation of the second FET 142a is in reverse correlation with the operation of the first FET 141a of the first switching element 141. That is the second FET 142a is turned off when the first FET 141a is turned on, whereas the second FET 142a is turned on when the first FET 141a is turned off. As a result, only when the first FET 141a is turned off, the energy stored in the choke coil 146 exits through the second path 170.

The second FET parasitic diode 142b is connected in a direction opposite to the direction of from the first point 161 to the negative electrode charge terminal 150b. The second FET parasitic diode 142b prevents a flow of the charging current to be applied to the protection circuit section 120 to the negative electrode charge terminal 150b, and additionally provides a path through which the energy stored in the choke coil 146 can escape, when the first FET 141a is turned off.

Although the first reverse-current prevention element 142 is illustrated to be the FET 142a including the parasitic diode 142b in this embodiment, the present invention is not limited thereto. The first reverse-current prevention element 142 may be formed only of a diode connected in a direction opposite to the direction of from the first point 161 to the negative electrode charge terminal 150b. Only with installation of such a diode, it is possible to achieve the desired purposes, e.g. prevention of a flow of the charging current to the negative electrode charge terminal 150b and formation of a path for the escape of the energy stored in the choke coil 146 when the first FET 141a is turned off.

The PWM controller 143 generates PWM signals and supplies them to the first FET 141a of the first switching element 141 and the second FET 142a of the first reverse-current prevention element 142. The PWM controller 143 transmits the second control signal opposite to the first control signal being transmitted to the first FET 141a to the second FET 142a, such that the operation of the second FET 142a is in reverse relationship with the operation of the first FET 141a.

The second reverse-current prevention element 144 is disposed on the second path 170. The second reverse-current prevention element 144 prevents the occurrence of reverse current flowing through the first reverse-current prevention element 142 when the positive electrode charge/discharge terminal 130a and the negative electrode charge/discharge terminal 130b are in the reversed charge connection. The second reverse-current prevention element 144 includes a third FET 144a. The third FET 144a is disposed in such a manner that a source and a drain are placed on the second path 170. The gate 144b of the third FET 144a is electrically connected to the positive electrode charge/discharge terminal 130a. Therefore, the operation of the third FET 144a is dependent on the polarity of the positive electrode charge/discharge terminal 130a. When a positive (+) voltage is applied to the gate 144b of the third FET 144a, the third FET 144a is turned on. When a zero (0) or negative (−) voltage is applied to the gate 144b of the third FET 144a, the third FET 144a is turned off. To ensure that such an operation can be achieved, an n-channel MOS FET, for example, may be used as the third FET 144a.

The third reverse-current prevention element 145 is a diode positioned on the first path 160 between the first switching element 141 and the positive electrode charge terminal 150a. The third reverse-current prevention element 145 is disposed in a direction opposite to the direction of from the first switching element 141 to the positive electrode charge terminal 150a, such that a flow of electric current from the first switching element 141 to the positive electrode charge terminal 150a is prevented.

The choke coil 146 removes high frequency noise from the charge voltage which was output from the first switching element 141, and then applies the final charge voltage to the protection circuit section 120. When the first switching element 141 is turned off, the energy stored in the choke coil 146 exits through the second path 170.

Hereinafter, charging of the secondary battery will be described in more detail with reference to FIG. 2.

First, charging of the battery will be illustrated when the secondary battery 100 is mounted in the reversed charge connection on a portable electronic device (not shown) such as a portable computer. As used herein, the term "reversed charge connection" refers to a reverse polarity connection of connectors of the portable electronic device to the positive electrode charge/discharge terminal 130a and the negative electrode charge/discharge terminal 130b. That is, the reversed charge connection means the state where the negative electrode terminal of the portable electronic device is connected to the positive electrode charge/discharge terminal 130a of the secondary battery 100 and the positive electrode terminal of the portable electronic device is connected to the negative electrode charge/discharge terminal 130b of the secondary battery 100.

In the reversed charge connection state, a reverse current flows in the protection circuit section 120. The MPU 126 senses the occurrence of reverse current through the current detection element 127 to thereby detect the reversed charge connection state. The MPU 126, which detected the reversed charge connection state, turns off the charge FET 122a and the discharge FET 123a of the charge/discharge switching section 121 through the AFE 125. Therefore, a flow of reverse current into the protection circuit section 120 is prevented to result in protection of circuit components of the protection circuit section 120. Further, the second reverse-current prevention element 144 of the charge circuit section 140 is turned off because the gate 144b was connected to the positive electrode charge/discharge terminal 130a to which a negative (−) voltage was applied due to the reversed charge connection. As a consequence, a flow of reverse current into the first reverse-current prevention element 142 can be prevented to result in protection of the first reverse-current prevention element 142.

If the secondary battery 100 was mounted in a normal state on the portable electronic device, the bare cell 110 is normally charged by the protection circuit section 120, and a flow of the charging current into the charge circuit section 140 is prevented by the second FET parasitic diode 142b of the first reverse-current prevention element 142 and the third reverse-current prevention element 145.

Hereinafter, charging of the secondary battery will be specifically described about when the secondary battery 100 is separated from the portable electronic device and is then charged through the charge circuit section 140.

A direct current (DC) input voltage is applied to the charge circuit section 140 through the positive electrode charge terminal 150a and the negative electrode charge terminal 150b. The input voltage is conventionally applied by an AC adaptor. The applied input voltage is stepped down to a charge voltage by the first switching element 141 whose duty ratio is controlled by the PWM controller 143, and the voltage dropped by the first switching element 141 is subjected to the removal of high frequency noise in the choke coil 146 and is then applied as the final charge voltage to the protection circuit section 120. Because the gate 144b is electrically connected to the positive electrode charge/discharge terminal 130a, a positive (+) voltage is applied to the third FET 144a of the second reverse-current prevention element 144 which is therefore always maintained in "turn on" state. When the first FET 141a of the first switching element 141 is in a "turn on" state, the second FET 142a of the first reverse-current prevention element 142 is turned off to result in blocking of the second path 170. When the first FET 141a of the first switching element 141 is turned off, the second FET 142a of the first reverse-current prevention element 142 is turned on. Herein, the third FET 144a of the second reverse-current prevention element 144 is turned on, so the energy stored in the choke coil 146 normally exits through the second path 170.

As apparent from the above description, the configuration of the present invention enables achievement of all the above-mentioned purposes of the present invention. Specifically, the present invention is constructed with provision of reverse-current prevention parts for preventing the occurrence of undesirable current in a charge circuit due to the reversed charge. As a consequence, it is possible to prevent potential damage of charge circuit components.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A secondary battery comprising:
a bare cell;
a protection circuit coupled to the bare cell wherein the protection circuit includes a positive electrode terminal and a negative electrode terminal that are adapted to be coupled to a load;
a charge circuit section adapted to process direct current input voltage and having a positive electrode charge terminal and a negative electrode charge terminal wherein the charge circuit section is coupled to the bare cell wherein the charge circuit section includes a first reverse-current prevention part that inhibits the flow of charging current to the negative electrode charge terminal and a second reverse current prevention part for inhibiting damage in a reversed charge connection state due to the flow of reverse current from the negative electrode charge terminal of the charge circuit section to the positive electrode terminal of the protection circuit due to reversed charge on the positive electrode terminal and the negative electrode terminal of the protection circuit;

wherein the first reverse current prevention part comprises a transistor, wherein the first reverse current prevention part further comprises a parasitic diode connected in parallel to the transistor, wherein the second reverse current prevention part is interposed between the first reverse current prevention part and the negative charge terminal and is configured so as to inhibit the flow of current through the first reverse current prevention part when a reverse charge occurs, and wherein the second reverse current prevention part comprises a transistor having a gate that is coupled to one of the electrode terminals of the protection circuit so that when a reverse current situation occurs, the transistor is turned off to thereby inhibit current flow through the first reverse current prevention part.

2. The battery of claim 1, wherein the first reverse current prevention part comprises a diode.

3. The battery of claim 1, wherein the charge circuit section has a charge control switch and a charge storage device interposed between the bare cell and the positive electrode charge terminal so as to be able to control the charge being delivered to the bare cell.

4. The battery of claim 3, wherein the first reverse current prevention part is interposed between the charge storage device and the negative electrode charge terminal so as to control the flow of discharge current to the negative electrode charge terminal.

5. The battery of claim 1, therein the gate of the transistor is electrically connected to the positive electrode terminal of the protection circuit.

6. The battery of claim 1, further comprising a third reverse current prevention part that inhibits the flow of reverse current through the charging circuit.

7. The battery of claim 6, wherein the third reverse current prevention part comprises a diode that is interposed between the positive electrode charge terminal and the first reverse current prevention part.

8. A secondary battery assembly comprising:
a bare cell;
a protection circuit interconnected between the bare cell and terminals that are adapted to be coupled to a load, wherein the protection circuit controls the state of charge of the bare cell;
a charge circuit adapted to process direct current input voltage that has a positive and negative input electrode, wherein the charge circuit provides charge to the bare cell via the protection circuit, wherein the charge circuit defines a positive charge path that extends between the positive electrode and the protection circuit and wherein a first switching device and a charge storage device is positioned along the positive charge path and wherein the charge circuit defines a stored energy discharge path between the storage device and the negative input electrode wherein a first reverse current protection element is positioned along the stored energy discharge path and wherein the charge circuit includes a second reverse current protection element that inhibits damage in a reversed charge connection state to the charge circuit by the flow of reverse current from the negative electrode charge terminal of the charge circuit section to the positive electrode terminal of the protection circuit due to reverse charge on the terminals of the protection circuit that couple to the load, wherein the first reverse current protection element comprises a transistor, wherein the first reverse current protection element further comprises a parasitic diode connected in parallel to the transistor, wherein the second reverse current protection element is interposed between the first reverse current protection element and the negative charge terminal and is configured so as to inhibit the flow of current through the first reverse current protection element when a reverse charge occurs, and wherein the second reverse current protection element comprises a transistor having a gate that is coupled to one of the electrode terminals of the protection circuit so that when a reverse current situation occurs, the transistor is turned off to thereby inhibit current flow through the first reverse current protection element.

9. The battery of claim 8, wherein the first reverse current protection element comprises a diode.

10. The battery of claim 8, wherein the first reverse current protection element is interposed between the charge storage device and the negative electrode charge terminal so as to control the flow of discharge current to the negative electrode charge terminal.

11. The battery of claim 8, wherein the gate of the transistor is electrically connected to the positive electrode terminal of the protection circuit.

12. The battery of claim 8, further comprising a third reverse current protection element that inhibits the flow of reverse current through the charge circuit.

13. The battery of claim 12, wherein the third reverse current protection element comprises a diode that is interposed between the positive electrode charge terminal and the first reverse current protection element.

* * * * *

UNITED STATES PATENT AND TRADEMARK OFFICE
CERTIFICATE OF CORRECTION

| | |
|---|---|
| PATENT NO. | : 8,945,735 B2 |
| APPLICATION NO. | : 12/708151 |
| DATED | : February 3, 2015 |
| INVENTOR(S) | : Youngjun Kim |

Page 1 of 1

It is certified that error appears in the above-identified patent and that said Letters Patent is hereby corrected as shown below:

Specification

In column 6 at line 28, Change "That is" to --That is,--.

In column 7 at line 14, Change "MOS FET," to --MOSFET,--.

Claims

In column 9 at line 33, In Claim 5, change "therein" to --wherein--.

Signed and Sealed this
Twelfth Day of January, 2016

Michelle K. Lee
*Director of the United States Patent and Trademark Office*